United States Patent [19]

Maurer

[11] Patent Number: 5,353,003
[45] Date of Patent: Oct. 4, 1994

[54] FORCE SENSOR

[75] Inventor: Dean J. Maurer, Galena, Ill.

[73] Assignee: Honeywell Inc., Minneapolis, Minn.

[21] Appl. No.: 961,994

[22] Filed: Oct. 16, 1992

[51] Int. Cl.$^5$ .................................. H01C 10/10
[52] U.S. Cl. ...................... 338/47; 338/36; 338/43
[58] Field of Search ................ 338/47, 43, 36

[56] References Cited

U.S. PATENT DOCUMENTS

3,790,870  2/1974  Mitchell .
3,828,294  8/1974  Baba et al. ..................... 338/43
3,993,150 11/1976  Brosh et al. .

Primary Examiner—Marvin M. Lateef
Attorney, Agent, or Firm—William D. Lanyi

[57] ABSTRACT

A force sensor is provided which incorporates a pressure transducer disposed within a housing structure. A force transmitting means, such as a shaft slidable within an opening, is provided to communicate force from an external source to a diaphragm of a pressure sensor. An elastomeric conductor is disposed between electronic components on the diaphragm of a pressure sensor die and conductive leads that are used to communicate signals from the pressure sensor die to components external to the present invention. In certain preferred embodiments, the present invention provides a preselected quantity of resilient material between a first end of the slidable shaft and the diaphragm of the pressure sensor die. Other embodiments place the first end of the shaft in direct contact with the diaphragm. The travel of the force transmitting shaft within an opening of the housing structure can be limited either by limiting the amount of extension of the shaft outside of the housing or, alternatively, by providing a travel limit member attached to the shaft and limited in its extent of travel within the housing structure.

8 Claims, 6 Drawing Sheets

; # FORCE SENSOR

BACKGROUND OF THE INVENTION

1. Field of the Invention

The present invention relates generally to a force sensor and, more particularly, to a force sensor that employs a pressure transducer in association with a moveable shaft for transmitting a force to a diaphragm of the pressure sensor.

2. Description of the Prior Art

Many different types of force sensing apparatus are well known to those skilled in the art. In addition, the use of semiconductor components in cooperation with levers is known to the skilled artisan in the field of force sensing. For example, U.S. Pat. No. 3,993,150, which issued to Brosh et al on Nov. 23, 1976, discloses an economical weighing apparatus that employs a cantilever beam structure. The scale utilizes a cantilever beam which has a transducer arrangement positioned on it. The beam is coupled to a platform by means of a rod inserted into an aperture in a linear bearing. It therefore provides a force only in the axial direction and enables the weighing of an object that is positioned at any location on a platform. U.S. Pat. No. 3,790,870, which issued to Mitchell on Feb. 5, 1974, describes a thin oxide force sensitive switch. The bistable solid state switch is provided by copper/cuprous oxide rectifying or blocking junction devices. A contacting thin cuprous oxide layer and an elemental form of a copper substrate have an interface between them. Devices of this type are arranged to avalanche from a blocking state to an essentially conducting state on the application of force when under a related voltage and then avalanche back to a blocking state on the removal of at least a portion of that force. The transition between the states is sharp and predictable, but free of arcing effects. Force switchable diodes of this type provide an inverse relationship between switching force and voltage and a positive relationship between switching force and thickness of the cuprous oxide layer.

Those skilled in the art of electronic circuit design and electronic packaging are familiar with connectors that comprise elastomeric material and a plurality of anisotropic conductors disposed within the elastomeric material to provide selective conductivity only in a preferred direction through the conductor. One supplier of this type of conductor, Fugipoly Incorporated, provides a high accuracy rubber connector referred to as the W series with anisotropic electrical conduction properties. The connectors comprise three hundred to two thousand fine metal wires per cubic centimeter which are embedded in the thickness direction of the transparent silicon rubber sheet. The connectors are inserted between opposite electrodes and provide electrical communication therebetween. The fine metal wires are gold plated to insure that requirements relating to low resistance and the ability to withstand relatively high electrical currents can be met. Fugipoly Incorporated also provides a low resistance elastomeric connector referred to as a ZEBRA which is constructed of alternating parallel layers of electrically conductive and nonconductive silicon elastomer. The conductive layer is filled with silver metal particles. The alternating layers provide electrical connection when placed between two aligned conducting surfaces.

An article titled "Guidelines for Designing Elastomeric Connectors into the System" was written by Leonard Buchoff in the August 1987 edition of Connection Technology. The article describes applications in which elastomeric elements are used in electronic circuit packaging applications where anisotropic conduction is required. In the Dec. 7, 1989 edition of EDN Magazine, Arthur Mosley wrote an article entitled "Elastomeric Connectors/Meet SMT Requirements" which describes the use of the silicone rubber selectively conductive components in various application. It also describes the electrical and temperature characteristics of silicone rubber and its tolerance to ultraviolet radiation, oxygen, ozone and humidity. These articles illustrate the wide knowledge of elastomeric conductors throughout the industry. The information contained in the articles and in the patents described above is expressly incorporated by reference in this application.

Certain applications of force sensors require the sensor to be extremely small, but also to be able to provide an analog signal that is directly proportional to the magnitude of a force being measured. As one particular example, a tactile response pen for use in conjunction with a computer terminal can provide information to the computer describing the magnitude of force that an operator is exerting on the pen against a computer data entry pad. This type of information can be combined with external information relating to the location of the pen contact with the pad to permit the computer to use the magnitude of force as an additional input variable. As one example of a use of this information, the total force can be correlated to the position of the pen to provide thicker or thinner lines resulting from movement of the pen, such as in the deriving of a signature.

Devices such as the application described immediately above require the force sensor to be extremely small while maintaining its accuracy capabilities. In addition, the magnitude of travel of the force sensing component in contact with an external component is very small. It would therefore be significantly beneficial if a force sensor can be made which is small yet accurate and durable.

SUMMARY OF THE INVENTION

A force sensor made in accordance with a preferred embodiment of the present invention comprises a pressure sensitive device which, in turn, comprises a means for providing an output signal that is representative of a pressure imposed on the pressure sensitive device. A preferred embodiment of the present invention further comprises a means for transmitting a force against the pressure sensitive device.

In a particularly preferred embodiment of the present invention, a pressure sensor die is made of silicon with a silicon substrate being attached to a silicon dioxide diaphragm with a portion of the substrate partially etched away to expose the diaphragm. The diaphragm of the silicon pressure die is disposed in contact with an elastomeric conductor that is capable of selectively conducting electrical current therethrough. On an opposite side of the pressure sensor, a media seal is provided. The force sensor housing is configured to compress the pressure sensor between the elastomeric conductor and the media seal. The elastomeric conductor is disposed in electrical communication with leads of the force sensor in order to communicate signals from the sensor die to an external component, such as a computer. The media seal is provided with an opening that permits force to be transmitted from a moveable shaft to the diaphragm of the pressure sensor. The moveable shaft is disposed in an opening of the housing. A first end of the shaft extends toward the pressure sensor die and a second end of the shaft extends toward an opening in the housing which permits the second end of the shaft to communicate with an external component against which a force is to be measured.

BRIEF DESCRIPTION OF THE DRAWINGS

The present invention will be more fully understood from a reading of the Description of the Preferred Embodiment in conjunction with the drawings, in which.

DESCRIPTION OF THE PREFERRED EMBODIMENT

Throughout the Description of the Preferred Embodiment, like components will be identified with like reference numerals and letters.

Figure 1:
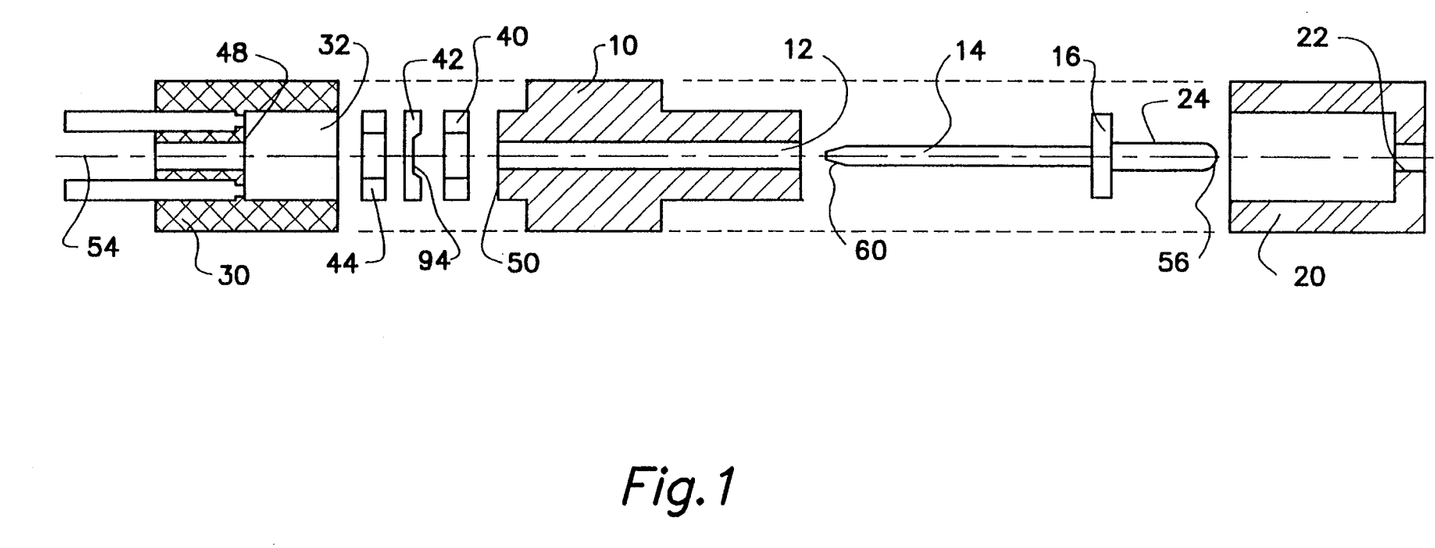
FIG. 1 shows an exploded view of one embodiment of the present invention.

In FIG. 1, an embodiment of the present invention is illustrated in an exploded view. A guide body 10 has an opening 12 extending therethrough. The opening is shaped to receive a shaft 14 in sliding relation therein. A travel stop 16 is attached to the shaft 14. A retaining cap 20 is shaped to receive a portion of the guide body therein. It is also provided with an opening 22 through which an extension portion 24 of shaft 14 can extend.

An alignment member 30 has an opening 32 that is shaped to receive both a portion of the guide body 10 and a plurality of components of the present invention. For example, in one particularly preferred embodiment of the present invention, a media seal 40, a pressure sensor 42 and an elastomeric conductor 44 are all disposed within opening 32 and compressed between a surface 48 of opening 32 and a surface 50 of the guide body 10.

With continued reference to FIG. 1, the shaft 14 is positioned within the opening 12 to be slidable moveable along central axis 54. This positioning of shaft 14 within opening 12 with the extension portion 24 extending through opening 22 of the cap 20 permits an external force to push against the second end 56 of shaft 14 and thereby transmit force along the central axis 54 to the pressure sensor 42. This transmission of force from the shaft 14 to the pressure sensor 42 can be accomplished in several different ways according to several different embodiments of the present invention. A first end 60 of shaft 14 can be placed in direct contact with a diaphragm 94 of the pressure sensor 42. Alternatively, a resilient substance can be disposed between the diaphragm and the first end of the shaft 60. Those embodiments will be described in greater detail below.

Figure 2:
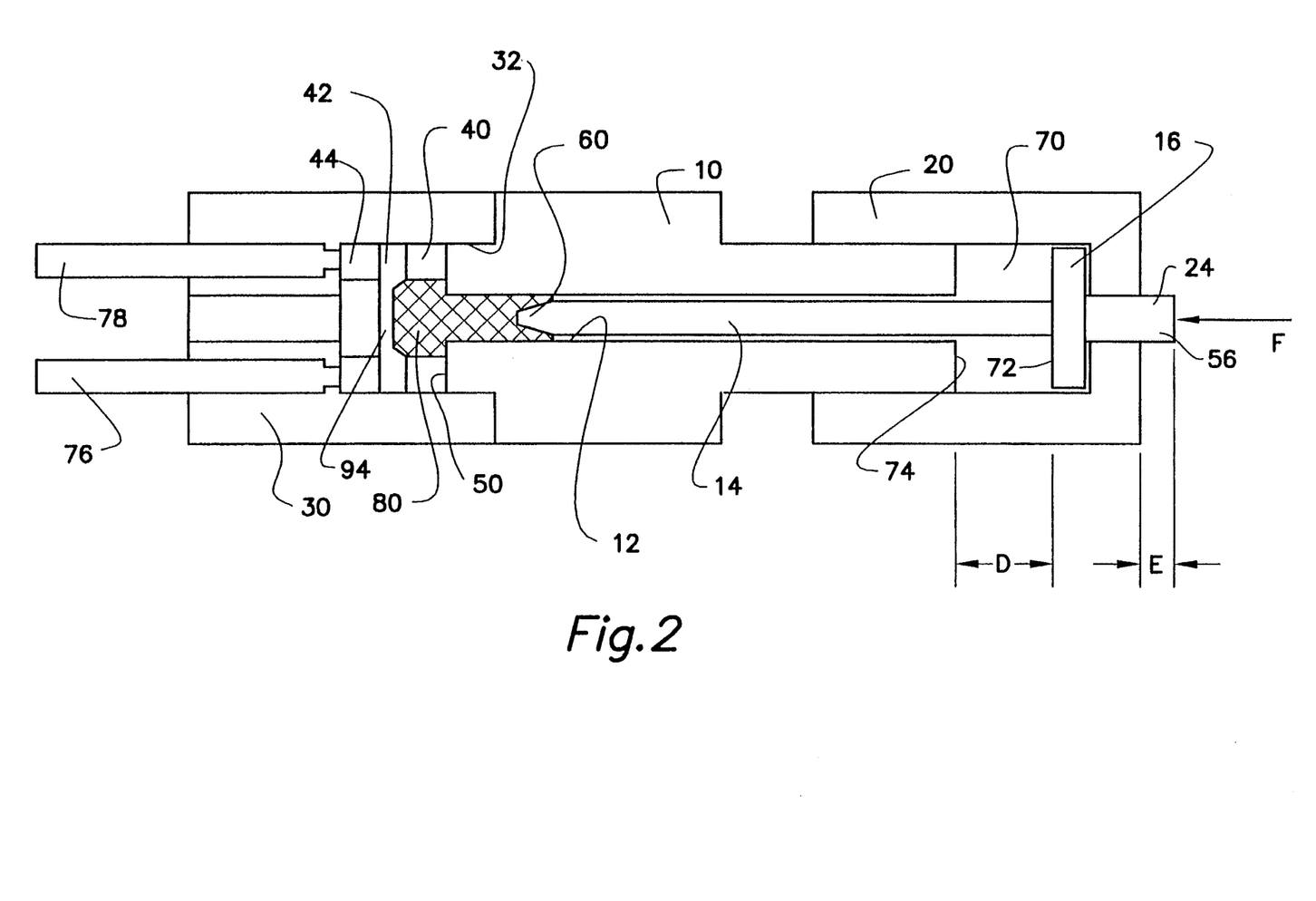
FIG. 2 shows an assembled view of the embodiment illustrated in FIG. 1.

FIG. 2 illustrates an embodiment that shows the guide body 10 attached to the alignment member 30. Within the opening 32, surface 50 of the guide body 10 is disposed along with the elastomeric conductor 44, the pressure sensor device 42 and the media seal 40. It should be clearly understood that the media seal 40 is not a requirement of the present invention. Although it provides a useful function in cushioning the contact between portion 50 of the guide body 10 and the pressure sensor 42, and provides an environmental seal, alternative embodiments of the present invention could be made without the media seal 40.

The shaft 14 is shown disposed within opening 12 so that it can slide along its central axis. The travel stop 16 is shown disposed within an opening 70 between the guide body 10 and an internal surface within the retaining cap 20. The size of opening 70 depends on the relative positions of the guide body 10 and the retaining cap 20. In the particular embodiment of the present invention shown in FIG. 2, a surface 72 of the travel stop 16 is spaced apart from a surface 74 of the guide body 10 by a distance identified by reference letter D. Although distance D would normally permit travel stop 16 to move all the way to a position against surface 74, it should be noted that the embodiment shown in FIG. 2 comprises a shaft extension 24 that only extends from the retaining cap 20 by an amount identified by reference letter E in FIG. 2. Therefore, certain applications of the present invention can utilize the extension magnitude E to limit the amount of travel of the shaft along its axis in response to a force exerted in the direction represented by arrow F in FIG. 2.

With continued reference to FIG. 2, it can be seen that conductors, 76 and 78, extend from one end of the alignment member 30. Those conductors pass through the alignment body 30 and are disposed in electrical communication with the elastomeric conductor 44. This electrical communication between the conductors, such as the identified by referenced numerals 76 and 78, and the elastomeric conductor 44 is provided by a compressive force exerted by the surface 50 of the guide body 10 against the components disposed within opening 32. In the embodiment shown in FIG. 2, a preselected amount of resilient material 80 is disposed between the diaphragm of the pressure sensor die 42 and the first end 60 of the shaft 14. The elastomeric material can be a room temperature vulcanizing (RTV) material or other types of resilient material which maintain an appropriate degree of elasticity over a functional temperature range. The resilient material 80 connects the first end 60 of shaft 14 in force communicating relation with the rightmost surface of the diaphragm 94 of the pressure sensor die 42. The material 80 provides several important functions in the embodiment of the present invention illustrated in FIG. 2. It acts as a spring member to cause the shaft 14 to return to its normal position when force F is removed. The resilient material 80 also distributes the force F in a generally even manner across the surface of the diaphragm of the pressure sensor 42. In addition, the resilient material 80 also provides a degree of fluid tight containment within the first opening 12 and in the space within an internal opening extending through the media seal 40. This fluid tight sealing function permits the device to be used in environments where liquids proximate the second end 56 of the shaft 14 would otherwise harm the components within opening 32, such as the pressure sensor die 42 or the elastomeric conductor 40.

Figure 3:
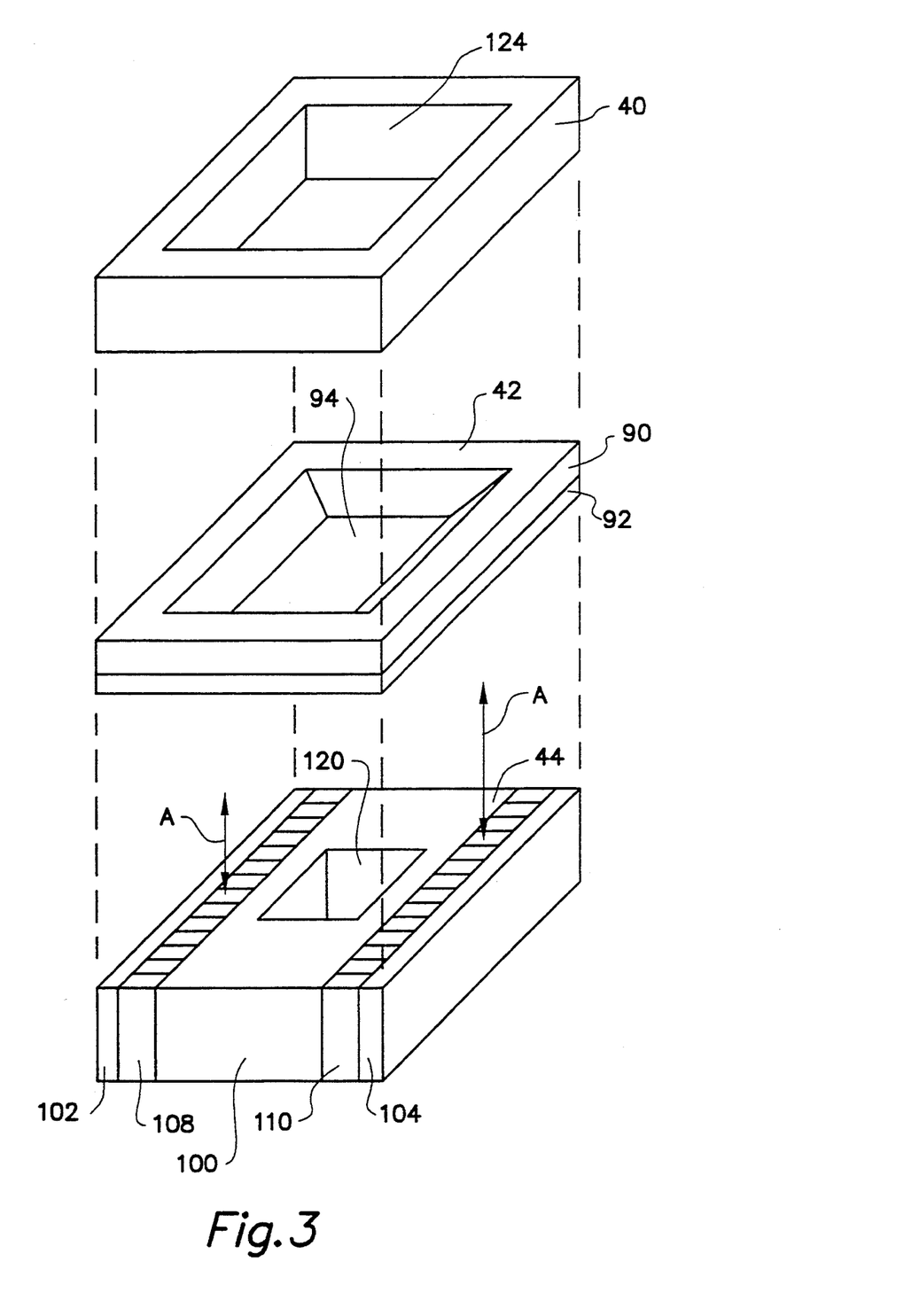
FIG. 3 shows an exploded view of several of the components used within the preferred embodiment of the present invention.

FIG. 3 illustrates an exploded view of the components that are disposed within opening 32 of the alignment member 30. The pressure sensor 42 comprises a silicon substrate 90 and a silicon dioxide surface 92 attached to one surface of the substrate. A portion of the silicon substrate 90 is etched away to expose a diaphragm 94 portion of the silicon dioxide layer 92. Although not shown in FIG. 3, the underside of the pressure sensor 42 comprises a plurality of electronic components disposed on the diaphragm. The disposition of electronic components, such as piezoresistors, on the diaphragm of the silicon pressure sensor die is well known to those skilled in the art. Movement of diaphragm 94 in response to changes in pressure thereon cause the diaphragm to flex and, in turn, causes the piezoresistors on the diaphragm to be distorted. In response to that distortion of the piezoresistors, they change their electrical characteristics. These changing electrical characteristics, such as resistance, can be measured by disposing the piezoresistors in a bridge circuit arrangement and measuring the change in resistance of those piezoresistors. This provides a signal that is representative of the pressure imposed on the diaphragm according to circuit arrangements and pressure measuring techniques that are known to those skilled in the art.

With continued reference to FIG. 3, an elastomeric conductor 44 is shown directly below the pressure sensor 42. Devices such as the elastomeric conductor 44 are well known to those skilled in the art. In one particular embodiment of the present invention, the elastomeric conductor 44 comprises a central nonconductive region 100 and edge nonconductive regions, 102 and 104. Between these nonconductive regions of the elastomeric conductor, selectively conductive regions 108 and 110 are disposed. Through techniques that are very well known to those skilled in the art, the selectively conductive regions, 108 and 110, conduct electricity selectively in the directions represented by arrows A. The strips within the selectively conductive regions, 108 and 110, represent alternating layers of conductive and nonconductive materials. The layers of conductive materials conduct electrical current in directions represented by arrows A while the nonconductive regions insulate those conductive regions from each other. Through these techniques, electrical signals can be transmitted through the elastomeric conductor 44 in a selective manner limited to passage in directions represented by arrows A.

The elastomeric conductor 44 shown in FIG. 3 is provided with a central opening 120 that connects the lower surface of diaphragm 94 in fluid communication with the ambient surroundings proximate the lower side of the elastomeric conductor 44. The selectively conductive regions, 108 and 110, are disposed in electrical communication with conductors on the lower side of surface 92 of die 42 (not shown in FIG. 3) although the conductive seal 44 acually contact the diaphragm 94. The connection between the elastomeric conductor 44 and the pressure sensor 42 permits electrical communication to be maintained between the conductors on the lower side of the die 42 and conductors disposed in contact with the underside of the elastomeric conductor 44 in FIG. 3.

Media seal 40 shown in FIG. 3 comprises a central opening 124 that is shaped and positioned to provide communication between the diaphragm 94 of the pressure sensor 42 and the ambient surroundings above the upper surface of media seal 40. In the embodiment discussed above in conjunction with FIG. 3, the central opening 124 provides communication between the opening 12 of the guide body 10 and the upper surface of diaphragm 94. In embodiments of the present invention which incorporate a preselected amount of resilient material 80 in opening 12, the central opening 124 of the media seal 40 also permits the resilient material 80 to flow into intimate contact with the diaphragm 94 and connect the diaphragm 94 in force transmitting communication with the first end 60 of the shaft 14.

Figure 4:
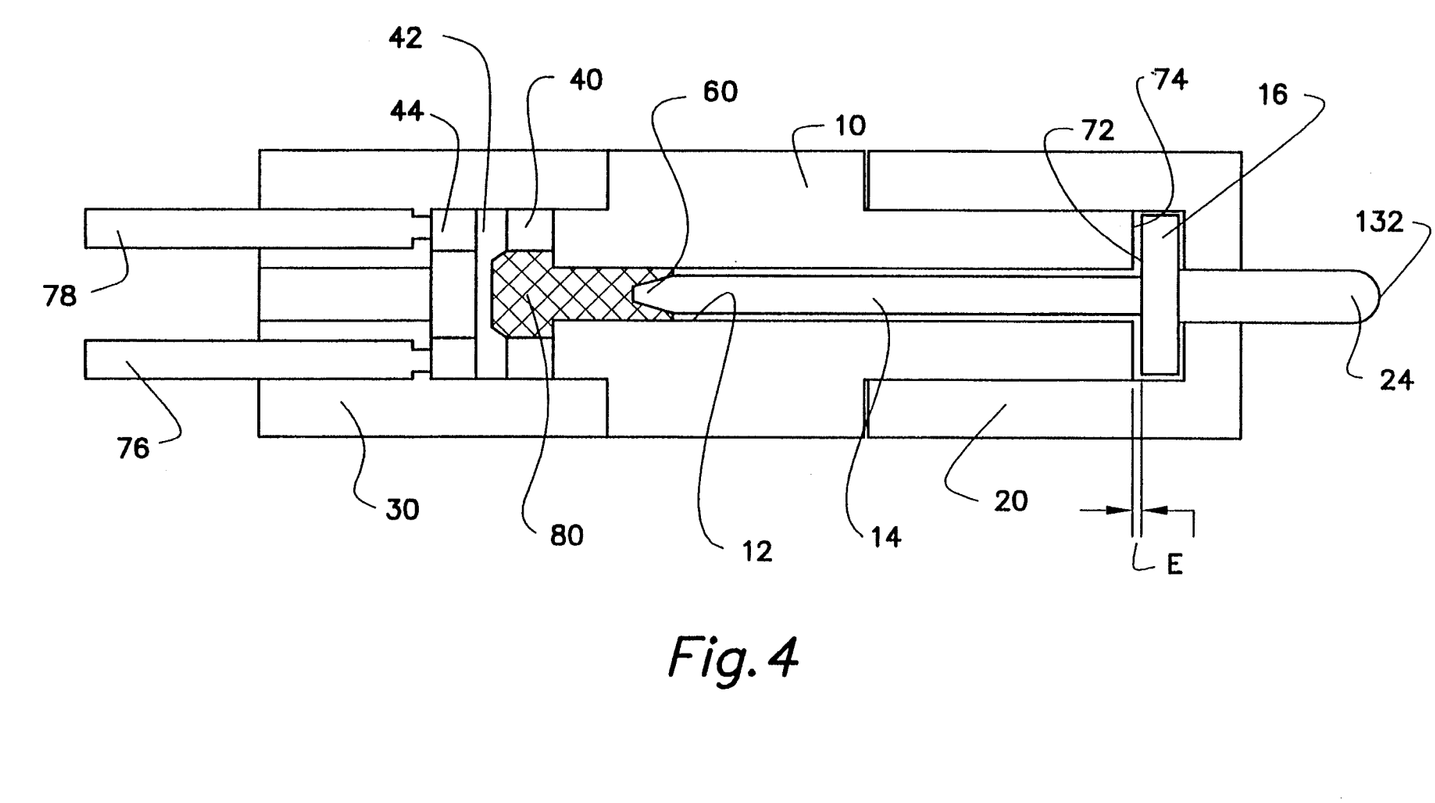
FIG. 4 shows an embodiment of the present invention that uses a preselected amount of resilient material as a force transmitting means.

The embodiment of the present invention illustrated in FIG. 4 is very similar to that illustrated in FIG. 2, but with several exceptions. Second end 56 is rounded as represented by reference numeral 132. In addition, opening 70 of FIG. 2 is essentially removed and replaced by a much smaller opening that permits only a limited amount of travel E of the shaft 14. This limited travel E is provided by the preselected dimension between surface 72 of the travel stop 16 and surface 74 of a portion of the guide body 10. Similar to the embodiment shown in FIG. 2, the embodiment illustrated in FIG. 4 attaches the retaining cap 20 to the guide body 10 which, in turn, is also attached to the alignment member 30 as described above. The opening 12 extending through the guide body 10 permits shaft 14 to move in slidable association along its centerline through the guide body. A predetermined amount of resilient material 80 is disposed in the opening 12 proximate the first end 60 of the shaft 14. That resilient material 80 provides force transmitting relation between the first end 60 of the shaft and the diaphragm of pressure sensor 42. The other components illustrated in FIG. 4 are generally similar to those described above in conjunction with FIG. 2.

Figure 5:
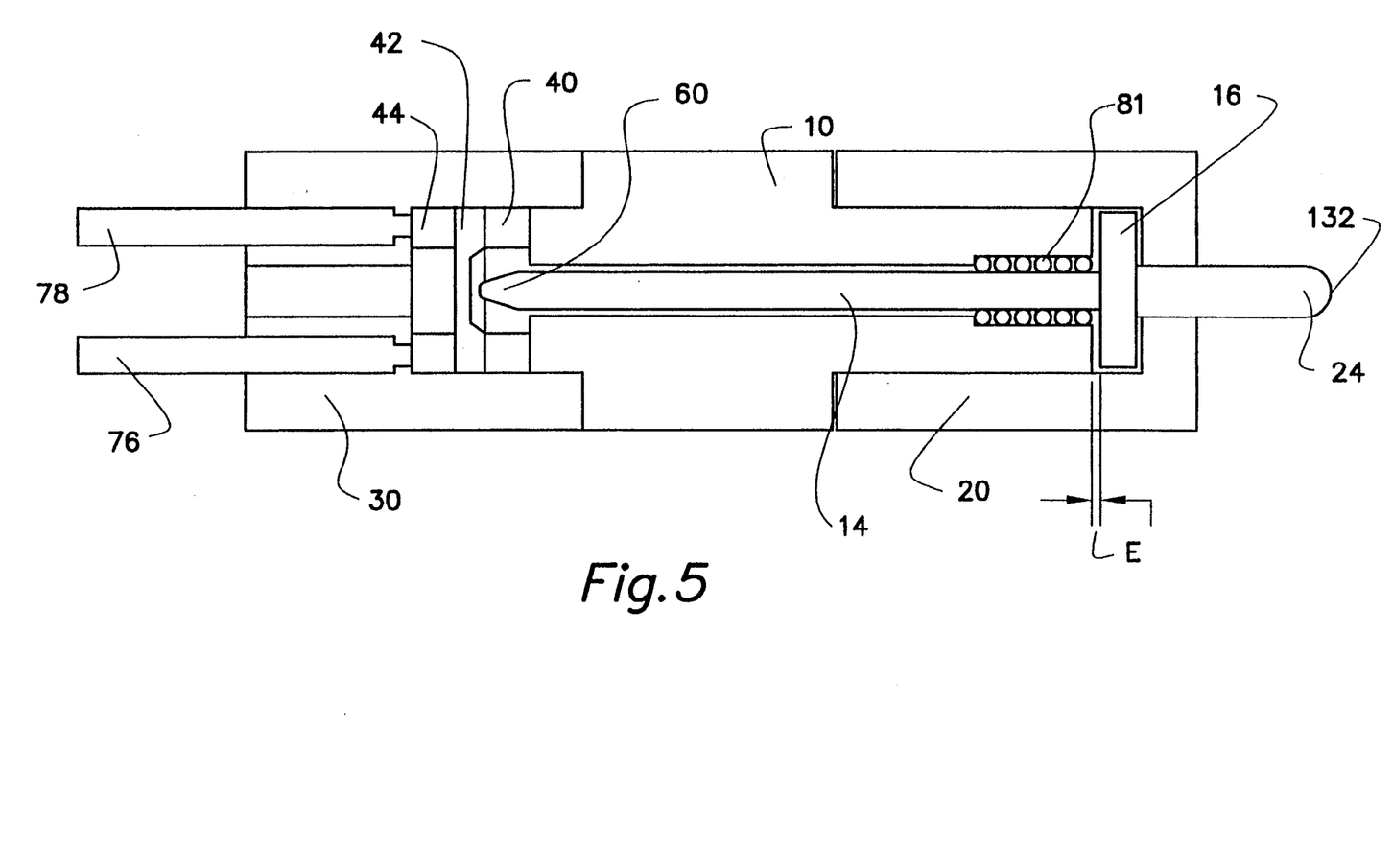
FIG. 5 shows an embodiment of the present invention that places a slidable shaft in direct contact with the diaphragm of the pressure sensor.

The embodiment of the present invention illustrated in FIG. 5 is similar in most respects to the other embodiments described above. However, no resilient material 80 is disposed proximate the first end 60 of shaft 14. Instead, direct contact between the first end 60 of shaft 14 and the diaphragm of pressure sensor 42 is permitted. The diaphragm is protected from damage by carefully maintaining the amount of travel E of the shaft. It should be understood that pressure sensors which incorporate diaphragms made of silicon dioxide can be damaged if the magnitude of travel of shaft 14 exceeds the permissible deflection of the diaphragm. Certain applications of force sensors are more suitable for use with direct contact between the first end 60 of shaft 14 and the diaphragm. Others are more suitable for use with preselected amounts of resilient material 80 as described above. When no resilient material is used, a return spring 81 can be provided.

Figure 6:
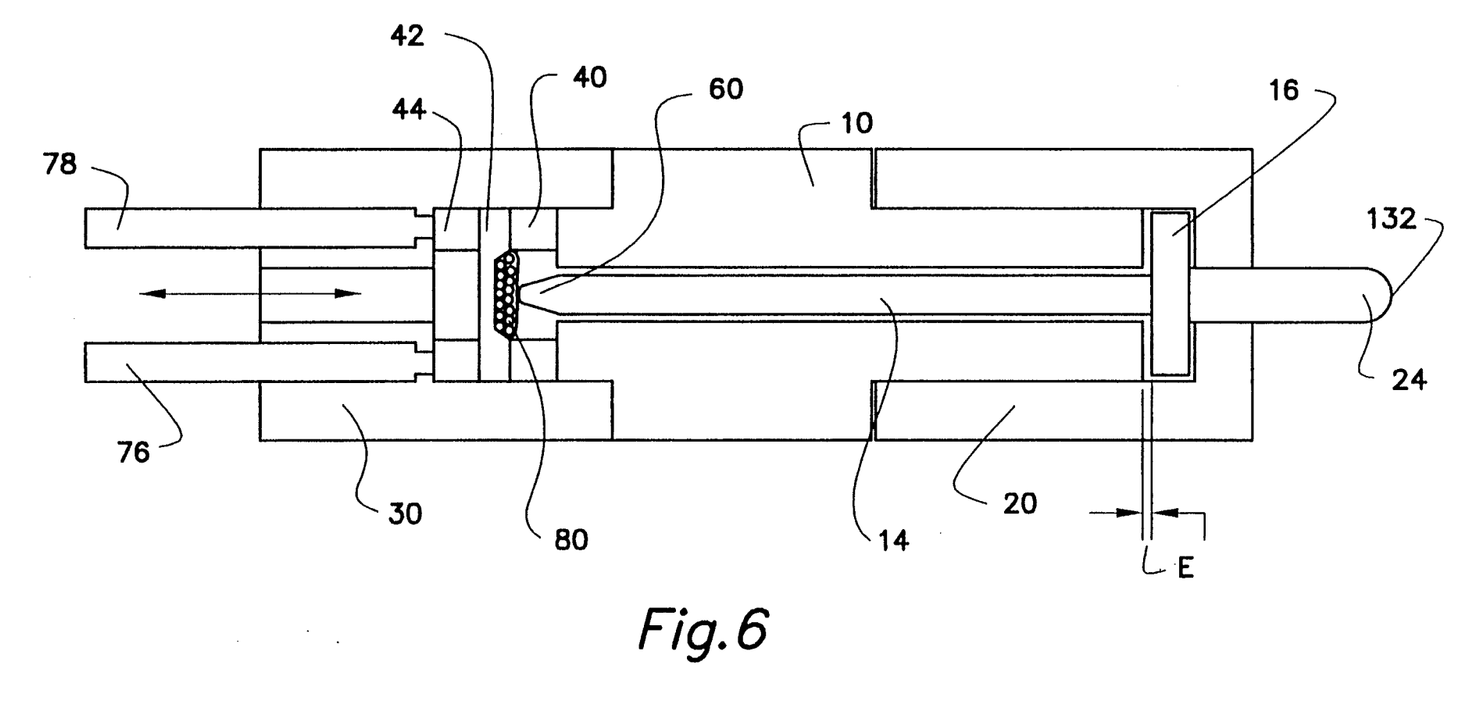
FIG. 6 shows an embodiment of the present invention that disposes a preselected and limited amount of resilient material in contact with the diaphragm of a pressure sensor but not encapsulating an end of a force transmitting shaft.

FIG. 6 shows another alternative embodiment of the present invention which is generally similar in most respects to the embodiments described above in conjunction with FIGS. 2, 4 and 5. The difference between the embodiment of FIG. 6 and the embodiment of FIG. 5 is that a preselected amount of resilient material 80 is disposed proximate the diaphragm of pressure sensor 42 in FIG. 6, whereas no resilient material 80 is used in the embodiment of FIG. 5. The embodiment shown in FIG. 6 differs from that shown in FIG. 4 by the fact that the resilient material 80 in FIG. 6 is not also disposed in opening 12. The primary difference between the embodiments illustrated in FIGS. 4 and 6 lies in the quantity of resilient material 80 disposed in opening 124 media seal 40 and in opening 12 of the guide body 10. Although the embodiments described above differ in certain respects, it should be clearly understood that they are alike in many basic characteristics that are important to the present invention. They all comprise a pressure sensor 42 which is responsive to changes in pressure and which is able to provide signals representing the pressure imposed on the diaphragm. All of the embodiments of the present invention also incorporate a means for transmitting a force from an external force to the diaphragm of the pressure sensor. That force transmitting means has been illustrated above as a shaft 14 that is slidably disposed in an opening of the guide body 10. All of the embodiments of the present invention also incorporate an elastomeric conductor disposed between the pressure sensor 42 and conductive leads within the alignment member 30.

Alternative embodiments of the present invention can use differing amounts of resilient material 80, varying from no resilient material as shown in FIG. 5 to sufficient material to fill the central opening 124 of media seal 40 and part of the opening 12 within the guide body. Alternative embodiments incorporate different forms of the second end 24 of shaft 14. Examples of rounded ends 132 are shown in FIGS. 4, 5 and 6. A flat end is illustrated in FIG. 2. Also, the travel of the shaft 14 is limited in several different ways in alternative embodiments of the present invention. The shaft 14 in the embodiment of FIG. 2 uses a limited extension of the shaft out of the retaining cap 20. The embodiments shown in FIGS. 4, 5 and 6 precisely locate the travel limit 16 with respect to surfaces within the retaining cap 20 and an end surface 74 of the guide body 10. In addition, it should clearly be understood that many other alternative embodiments of the present invention are available within its scope.

The embodiments of the invention in which an exclusive property or right is claimed are defined as follows:

1. A force sensor, comprising:
a pressure sensitive device disposed within a housing and comprising means for providing an output signal representative of a pressure imposed on it;
means for transmitting said force to said pressure sensitive device, said transmitting means comprising a shaft slidably disposed in said housing, said shaft being moveable along a first axis and being disposed in force communicating association with said pressure sensitive device, said pressure sensitive device being a silicon device, said pressure sensitive device comprising a diaphragm which is moveable in response to pressure imposed thereon by a first end of said shaft;
a piezoresistor associated with said diaphragm to deform said piezoresistor in response to movement of said diaphragm; and
resilient means, disposed between said diaphragm and said first end of said shaft proximate said diaphragm, for exerting pressure on said diaphragm in response to a force exerted against said second end of said shaft, said shaft extending through an opening of said housing, said second end of said shaft being external to said housing.

2. The sensor of claim 1, wherein:
said exerting means is a room temperature vulcanizing material.

3. A force sensor, comprising:
a housing;
a shaft having a first end and a second end, said housing having a first opening shaped to receive said shaft in sliding association therein, said shaft being disposed in said first opening, said second end of said shaft extending from said housing;
a pressure sensitive device disposed within a second opening of said housing, said first end of said shaft being disposed in force transmitting association with said pressure sensitive device, said first end of said shaft being spaced apart from said pressure sensitive device by a preselected distance;
said pressure sensitive device comprising a silicon substrate and a diaphragm that is moveable in response to changes in pressure imposed thereon;
at least one piezoresistor disposed on said diaphragm; and
a resilient material disposed in pressure transmitting relation between said first end of said shaft and said pressure sensitive device, said pressure sensitive device being responsive to a force exerted on said second end of said shaft.

4. A force sensor, comprising:
a housing having a cavity and an opening, said opening extending between said cavity and a position external to said housing;
a pressure sensitive device disposed within said cavity, said pressure sensitive device providing an output signal representative of a pressure imposed on said pressure sensitive device, said pressure sensitive device comprising a diaphragm which is flexible in response to changes of pressure imposed on it; and
a shaft, having a first end and a second end, extending through said opening, said second end of said shaft extending in a direction away from said pressure sensitive device to a position external to said housing and said first end of said shaft extending toward said pressure sensitive device, said shaft being moveable within said opening toward said pressure sensitive device in response to a force exerted against said second end of said shaft.

5. The sensor of claim 4, wherein:
said first end of said shaft is in contact with said pressure sensitive device.

6. The sensor of claim 4, wherein:
said first end of said shaft is spaced apart from said pressure sensitive device, defining a gap therebetween.

7. The sensor of claim 6, further comprising:
a resilient material disposed between said first end of said shaft and said pressure sensitive device within said gap.

8. The sensor of claim 1, wherein:
said resilient material is a room temperature vulcanizing material.

* * * * *